United States Patent
Valadez

(10) Patent No.: US 7,616,836 B2
(45) Date of Patent: Nov. 10, 2009

(54) METHOD AND SYSTEM FOR MOTION COMPENSATION IN A TEMPORAL SEQUENCE OF IMAGES

(75) Inventor: Gerardo Hermosillo Valadez, Exton, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 705 days.

(21) Appl. No.: 11/133,589

(22) Filed: May 20, 2005

(65) Prior Publication Data

US 2005/0265611 A1 Dec. 1, 2005

Related U.S. Application Data

(60) Provisional application No. 60/574,037, filed on May 25, 2004.

(51) Int. Cl.
G06K 9/32 (2006.01)
A61B 5/05 (2006.01)
G06K 9/36 (2006.01)

(52) U.S. Cl. .................. 382/294; 600/410; 382/276

(58) Field of Classification Search ............. 382/130, 382/236, 240, 264, 274, 276, 278, 289, 294–296; 600/410; 345/420
See application file for complete search history.

(56) References Cited

U.S. PATENT DOCUMENTS 6,611,615 B1 * 8/2003 Christensen ............ 382/130

| | | | |
|---|---|---|---|
| 2002/0122576 A1 | 9/2002 | Weese et al. | |
| 2003/0156111 A1 * | 8/2003 | Joshi et al. | 345/420 |
| 2004/0260170 A1 * | 12/2004 | Wood et al. | 600/410 |
| 2005/0113651 A1 | 5/2005 | Wood et al. | |

OTHER PUBLICATIONS

"Variational Methods for Multimodal Image Matching—Theses de doctorat", Hermosillo Valadez, May 3, 2002, Universite de Nice—Sophia Antipolis, Ecole Doctorate Sciences et Technologies De L'Information et de la Communication, Specialite Images & Vision, Nice, France.

"Flows of diffeomorphisms for multimodal image registration", Chefd'Hotel et al., Biomedical Imaging, 2002, Proceedings 2002 IEEE International Symposium on Jul. 7-10, 2002, Piscataway, NJ, pp. 753-756.

"Dense image matching with global and local statistical criteria: a variational approach", Hermosillo et al, Proceedings 2001 IEEE Conference on Computer Vision and Pattern Recognition, CVPR 2001, Kauai, Hawaii, Dec. 8-14, 2001, vol. 1 of 2, Dec. 8, 2001, pp. 73-78.

"Software for Image registration: Algorithms, accuracy, efficacy", Hutton et al., Seminars in Nuclear Medicine, Grune and Stratton, Orlando, FL, vol. 33, No. 3, Jul. 2003, pp. 180-192.

(Continued)

Primary Examiner—Kanji Patel

(57) ABSTRACT

A method and system for performing motion compensation in a temporal sequence of images include performing a conjugate gradient maximization of a similarity measure between two images, based on the local cross-correlation of corresponding regions to obtain a displacement field for warping one of the images. The non-singularity of the deformation is ensured by utilizing a composition of regularized gradients of the similarity measure when building the solution.

65 Claims, 4 Drawing Sheets

OTHER PUBLICATIONS

"Comparative evaluation of multiresolution optimization strategies for multimodality image registration by maximization of mutual information", Maes et al., Medical Image Analysis, vol. 3, No. 4, Dec. 1999, pp. 373-386.

"Retrospective Motion Correction in Digital Subtraction Angiography: A Review", Meijering et al., IEEE Transactions on Medical Imaging, IEEE Service Center, Piscataway, NJ, vol. 18, No. 1, Jan. 1999.

"Numerical recipes: the art of scientific computing", Press et al., 1989, Numerical Recipes in Pascal. Art of Scientific Computing, Cambridge, Cambridge Univ. Press, GB, pp. 274-334.

International Search Report including Notification of Transmittal of the International Search Report, International Search Report and Written Opinion of the International Searching Authority, PCT Appln. No. PCT/US2005/018267, mailed Jun. 21, 2006.

* cited by examiner

METHOD AND SYSTEM FOR MOTION COMPENSATION IN A TEMPORAL SEQUENCE OF IMAGES

CROSS-REFERENCE TO RELATED APPLICATIONS PRIORITY

Specific reference is hereby made to U.S. Provisional Patent Application No. 60/574,037, entitled METHOD AND SYSTEM FOR MOTION COMPENSATION IN A TEMPORAL SEQUENCE OF IMAGES, filed May 25, 2004 in the name of Gerardo Hermosillo Valadez, the inventor in the present application, and of which the benefit of priority is claimed and whereof the disclosure is hereby incorporated herein by reference.

FIELD OF THE INVENTION

The present application relates generally to motion compensation in images and, more particularly, to motion compensation in a temporal sequence of images.

BACKGROUND OF THE INVENTION

Medical imaging techniques are used in the detection of cancer or precancerous conditions in a patient. An important application is in the detection of tumors or potential tumors in breast cancer. Potential tumors are difficult to detect but it is known that such tissue typically exhibits a more rapid intake (wash-in) of contrast agent, as well as a more rapid washout than adjacent, non-tumor tissue. This difference in behavior allows the detection of suspect tissue through comparison of images of a patient made before and after such wash-in and/or washout. Using such time sequential images made by an imaging technique such as magnetic resonance imaging (MRI), a comparison may be made between images to detect differences due to the contrast wash-in and washout behavior exhibit by different regions of the acquired MR volume so as to detect such suspect tissue.

In order to perform this detection advantageously, one needs to track the intensity of a single voxel in a temporal sequence of such volumes. However, a difficulty arises in that the patient typically moves between consecutive acquisitions and thereby introduces motion-related differences between the acquired images whereby a single point in space can no longer be tracked, unless motion correction is performed.

It is an object of the present invention to solve the motion correction problem in an advantageous manner in, for example, breast MR detection of potential tumors which are detected as tissue that has a rapid intake (wash-in) of contrast agent, as well as a rapid washout.

Prior art approaches to solving this problem in the past have computed the optic-flow between two images, of which an arbitrary one is selected as the reference among the images of the sequence. The two images are obtained from the acquired images by computing a Laplacian pyramid. The optic flow is calculated by solving a minimization problem of the point-to-point difference between the two Laplacian images.

The problem of estimating the geometric deformation between two images has a long history in the scientific literature. Techniques for computing the optic flow can be traced back to papers like B. K. Horn and B. G. Schunk: Determining optical flow, *Artificial Intelligence*, 17:185-203, 1981, and references cited therein. The use of the cross-correlation as similarity measure can be found in Olivier Faugeras, Bernard Hotz, Herv Mathieu, Thierry Viville, Zhengyou Zhang, Pascal Fua, Eric Thron, Laurent Moll, Grard Berry, Jean Vuillemin, Patrice Bertin, and Catherine Proy: Real time correlation based stereo: algorithm implementations and applications, Technical Report 2013, INRIA Sophia-Antipolis, France, 1993; Olivier Faugeras and Renaud Keriven: Variational principles, surface evolution, PDE's, level set methods and the stereo problem, *IEEE Transactions on Image Processing*, 7(3):336-344, March 1998; Jacques Bride and Gerardo Hermosillo: Recalage rigide sans contrainte de preservation d'intensite par regression heteroscdastique. In *TAIMA*, Hammamet, Tunisie, October 2001; P Cachier and X. Pennec: 3d non-rigid registration by gradient descent on a gaussian weighted similarity measure using convolutions, in *Proceedings of MMBIA*, pages 182-189, June 2000; and T. Netsch, P. Rosch, A. van Muiswinkel, and J. Weese: Towards real-time multi-modality 3d medical image registration, in *Proceedings of the 8th International Conference on ComputerVision*, Vancouver, Canada, 2001. IEEE Computer Society, IEEE Computer Society Press.

Other related similarity measures have been proposed, like the correlation ratio, A. Roche, G. Malandain, X. Pennec, and N. Ayache: The correlation ratio as new similarity metric for multimodal image registration, in W. M. Wells III, P. Viola, H. Atsumi, S. Nakajima, and R. Kikinis: Multi-modal volume registration by maximization of mutual information. *Medical Image Analysis*, 1(1):35-51, 1996, pages 1115-1124, and the mutual information, Paul Viola: *Alignment by Maximisation of Mutual Information*. PhD thesis, MIT, 1995; Paul Viola and William M. Wells III: Alignment by maximization of mutual information, *The International Journal of Computer Vision*, 24(2): 137-154, 1997; F. Maes, A. Collignon, D. Vandermeulen, G. Marchal, and P. Suetens: Multimodality image registration by maximization of mutual information, *IEEE transactions on Medical Imaging*, 16(2):187-198, April 1997; W. M. Wells III et al., op. cit., among others, R. P. Woods, J. C. Maziotta, and S. R. Cherry: MRI-pet registration with automated algorithm, *Journal of computer assisted tomography*, 17(4):536-546, 1993; D. Hill: *Combination of 3D medical images from multiple modalities*. PhD thesis, University of London, December 1993: G. Penney, J. Weese, J. A. Little, P. Desmedt, D. LG. Hill, and D. J. Hawkes: A comparison of similarity measures for use in 2d-3d medical image registration, In J.van Leeuwen G. Goos, J. Hartmanis, editor, *First International Conference on Medical Image Computing and Computer-Assisted Intervention*, volume 1496 of *Lecture Notes in Computer Science*. Springer, 1998; and M. E. Leventon and W. E. L. Grimson: Multi-Modal Volume Registration Using Joint Intensity Distributions: in W. M. Wells, A. Colchester, and S. Delp, editors. Number 1496 in Lecture Notes in Computer Science, Cambridge, Mass., USA, October 1998. Springer.

Conjugate Gradient minimization is described in William H. Press, Brian P. Flannery, Saul A. Teukolsky, and William T. Vetterling: *Numerical Recipes in C*. Cambridge University Press, 1988. The type (or family) of deformation which is assumed is the second key component of any motion correction algorithm. Parametric transformations are the most commonly used. See Chuck Meyer, Jennifer Boes, Boklye Kim, and Peyton Bland: Evaluation of control point selection in automatic, mutual information driven, 3d warping, in J.van Leeuwen G. Goos, J. Hartmanis, editor, *First International Conference on Medical Image Computing and Computer-Assisted Intervention, Proceedings*, volume 1496 of *Lecture Notes in Computer Science*, October 1998; D. Ruckert, C. Hayes, C. Studholme, P. Summers, M. Leach, and D. J. Hawkes: Non-rigid registration of breast MR images using mutual information, in W. M. Wells, A. Colchester, and S.

Delp, editors, Number 1496 in Lecture Notes in Computer Science, Cambridge, Mass., USA, October 1998, Springer; Paul Viola. *Alignment by Maximisation of Mutual Information*, PhD thesis, MIT, 1995; W. M. Wells III, P. Viola, H. Atsumi, S. Nakajima, and R. Kikinis. Multi-modal volume registration by maximization of mutual information. *Medical Image Analysis*, 1(1):35-51, 1996; and Paul Viola and William M. Wells III: Alignement by maximization of mutual information, *The International Journal of Computer Vision*, 24(2): 137-154, 1997.

When the deformation is not defined parametrically, the family is often constrained by requiring some smoothness of the displacement field, possibly preserving discontinuities. See J. P. Thirion. Image matching as a diffusion process: An analogy with Maxwell's demons, *Medical Image Analysis*, 2(3):243-260, 1998; L. Alvarez, R. Deriche, J. Weickert, and J. Sánchez: Dense disparity map estimation respecting image discontinuities: A PDE and scale-space based approach, *International Journal of Visual Communication and Image Representation, Special Issue on Partial Differential Equations in Image Processing, Computer Vision and Computer Graphics*, 2000; M. Proesmans, L. Van Gool, E. Pauwels, and A. Oosterlinck: Determination of Optical Flow and its Discontinuities using Non-Linear Diffusion, in *Proceedings of the 3rd ECCV, II*, number 801 in Lecture Notes in Computer Science, pages 295-304, Springer-Verlag, 1994; and L. Alvarez, J. Weickert, and J. Sánchez: Reliable Estimation of Dense Optical Flow Fields with Large Displacements, Technical report, Cuadernos del Instituto Universitario de Ciencias y Tecnologias Ciberneticas, 2000: a revised version has appeared at IJCV 39(1):41-56,2000; E. Mmin and P. Prez: A multigrid approach for hierarchical motion estimation, in *Proceedings of the 6th International Conference on Computer Vision*, pages 933-938, IEEE Computer Society Press, Bombay, India, January 1998; E. Mmin and P. Prez: Dense/parametric estimation of fluid flows, in *IEEE Int. Conf. on Image Processing*, ICIP'99, Kobe, Japan, October 1999: G. Aubert, R. Deriche, and P. Kornprobst: Computing optical flow via variational techniques, *SIAM Journal of Applied Mathematics*, 60(1): 156-182, 1999; G. Aubert and P. Kornprobst: A mathematical study of the relaxed optical flow problem in the space BV, *SIAM Journal on Mathematical Analysis*, 30(6): 1282-1308, 1999; and R. Deriche, P. Kornprobst, and G. Aubert: Optical flow estimation while preserving its discontinuities: A variational approach, in *Proceedings of the 2nd Asian Conference on Computer Vision*, volume 2, pages 71-80, Singapore, December 1995.

Some regularizing approaches are based on explicit smoothing of the field, as in J. P. Thirion: Image matching as a diffusion process: An analogy with Maxwell's demons, *Medical Image Analysis*, 2(3):243-260, 1998; and Christophe Chefd'hotel, Gerardo Hermosillo, and Olivier Faugeras. Flows of Diffeomorphisms for Multimodal Image Registration, in *International Symposium on Biomedical Imaging*. IEEE, 2002, while others consider an additive term in the error criterion, yielding (possibly anisotropic) diffusion terms, see G. Aubert and P. Kornprobst: *Mathematical Problems in Image Processing: Partial Differential Equations and the Calculus of Variations*, volume 147 of *Applied Mathematical Sciences*, Springer-Verlag, January 2002; J. Weickert and C. Schnörr: A theoretical framework for convex regularizers in pde-based computation of image motion, *The International Journal of Computer Vision*, 45(3):245-264, December 2001; Gerardo Hermosillo, Christophe Chefd'hotel, and Olivier Faugeras: Variational methods for multimodal image matching, *The International Journal of Computer Vision*, 50(3):329-343, November 2002; G. Hermosillo and O. Faugeras: Dense image matching with global and local statistical criteria: a variational approach, in *Proceedings of CVPR'01*, 2001; and Gerardo Hermosillo: *Variational Methods for Multimodal Image Matching*, PhD thesis, INRIA: the document is accessible at ftp://ftp-sop.inria.fr/robotvis/html/Papers/hermosillo:02.ps.gz, 2002.

Fluid methods fix the amount of desired smoothness or fluidness of the deformation using a single parameter. See Christophe Chefd'hotel, Gerardo Hermosillo, and Olivier Faugeras: Flows of Diffeomorphisms for Multimodal Image Registration, in *International Symposium on Biomedical Imaging*, IEEE, 2002; Gary Christensen, MI Miller, and MW Vannier: A 3D deformable magnetic resonance textbook based on elasticity, in *Proceedings of the American Association for Artificial Intelligence, Symposium: Applications of Computer Vision in Medical Image Processing*, 1994; and Alain Trouv: Diffeomorphisms groups and pattern matching in image analysis, *International Journal of Computer Vision*, 28(3):213-21, 1998.

Multi-resolution approaches have also been previously investigated. See L. Alvarez, J. Weickert, and J. Sánchez: Reliable Estimation of Dense Optical Flow Fields with Large Displacements, Technical report, Cuadernos del Instituto Universitario de Ciencias y Tecnologias Ciberneticas, 2000. A revised version has appeared at IJCV 39(1):41-56,2000. In L. Alvarez et al., op. cit., a scale-space focusing strategy is used. Most of the existing methods either do not account for intensity variations or are limited to parametric transformations.

Extensions to more complex transformations which account for intensity variations include approaches relying on block-matching strategies. See J. B. A. Maintz, H. W. Meijering, and M. A. Viergever: General multimodal elastic registration based on mutual information, in *Medical Imaging 1998—Image Processing*, volume 3338, pages 144-154. SPIE, 1998; T. Gaens, F. Maes D. Vandermeulen, and P. Suetens: Non-rigid multimodal image registration using mutual information, in J.van Leeuwen G. Goos, J. Hartmanis, editor, *First International Conference on Medical Image Computing and Computer-Assisted Intervention*, volume 1496 of *Lecture Notes in Computer Science Springer*, 1998; and N. Hata, T. Dohi, S. Warfield, W. Wells III, R. Kikinis, and F. A. Jolesz: Multi-modality deformable registration of pre- and intra-operative images for MRI-guided brain surgery, in J.van Leeuwen G. Goos, J. Hartmanis, editor, *First International Conference on Medical Image Computing and Computer-Assisted Intervention*, volume 1496 of *Lecture Notes in Computer Science*. Springer, 1998; or parametric intensity corrections, see A. Roche, A. Guimond, J. Meunier, and N. Ayache: Multimodal Elastic Matching of Brain Images, in *Proceedings of the 6th European Conference on Computer Vision*, Dublin, Ireland, June 2000.

Some recent approaches rely on the computation of the gradient of the local cross-correlation. See P. Cachier and X. Pennec: 3d non-rigid registration by gradient descent on a gaussian weighted similarity measure using convolutions. In *Proceedings of MMBIA*, pages 182-189, June 2000; T. Netsch, P. Rosch, A. van Muiswinkel, and J. Weese: Towards real-time multi-modality 3D medical image registration, in *Proceedings of the 8th International Conference on Computer Vision*, Vancouver, Canada, 2001, IEEE Computer Society, IEEE Computer Society Press; Gerardo Hermosillo, Christophe Chefd'hotel, and Olivier Faugeras. Variational methods for multimodal image matching. *The International Journal of Computer Vision*, 50(3):329-343, November 2002; G. Hermosillo and O. Faugeras: Dense image matching with global and local statistical criteria: a variational approach, in

*Proceedings of CVPR'01*, 2001; Gerardo Hermosillo: *Variational Methods for Multimodal Image Matching*. Phd thesis, INRIA: the document is accessible at ftp://ftp-sop.inria.fr/robotvis/html/Papers/hermosillo:02.ps.gz, 2002; and Christophe Chefd'hotel, Gerardo Hermosillo, and Olivier Faugeras: Flows of Diffeomorphisms for Multimodal Image Registration, in *International Symposium on Biomedical Imaging*. IEEE, 2002.

General background material on optic flow and on image pyramids may be found in textbooks and publications relating to image processing. Textbooks useful in providing background material helpful to gaining a better understanding of the present invention include, for example, FUNDAMENTALS OF IMAGE PROCESSING by Arthur R. Weeks, SPIE Optical Engineering Press & IEEE Press; 1996; IMAGE PROCESSING, ANALYSIS, AND MACHINE VISION, Second Edition, by Milan Sonka et al., PWS Publishing; 1999; and DIGITAL IMAGE PROCESSING, Second Edition, by Rafael C. Gonzalez et al., Prentice Hall; 2002.

SUMMARY OF THE INVENTION

It is herein recognized that, when such known prior art approaches are used, the non-singularity of the deformation is not ensured. Accordingly, it is possible for the motion correction step to reduce a tumor to a point, and thereby hide it from detection.

An object of the present invention is to provide an efficient method for compensating for motion that has occurred between two images having a general similarity and having been acquired at different times.

In accordance with an aspect of the present invention, a method and system for performing motion compensation in a temporal sequence of images are herein disclosed and described. The compensation is done by performing a conjugate gradient maximization of a similarity measure between two images, based on the local cross-correlation of corresponding regions around each point. The non-singularity of the deformation is ensured by a special composition technique when building the solution.

In accordance with an aspect of the present invention, a method for motion compensation in images utilizes a known mathematical property of invertible deformations, namely, that the composition of invertible deformations results in an overall deformation which is itself invertible. It is herein recognized that the component deformations need to be sufficiently small to avoid problems with singularities.

In accordance with an aspect of the invention, a combination of a conjugate gradient optimization with a composition of small and smooth displacements is utilized, which achieves fast convergence while ensuring that the deformation stays nonsingular.

In accordance with an aspect of the present invention, the non-singularity of the deformation is ensured by a special composition technique when building the solution. The use of the local cross-correlation as a similarity measure between two images is more robust than a point-to-point comparison.

In accordance with another aspect of the invention, special handling of the multi-resolution pyramid, with only the slices being reduced in size, improves the precision with respect to reducing in all directions.

In accordance with another aspect of the present invention, global handling of the sequence and a multi-resolution approach are utilized. The system is designed to work with a set of images as input, which is assumed to be a temporal sequence of similar images, such as images of the same patient acquired at different points in time for identifying differences between the images due to relatively rapid intake and/or washout of a contrast agent. As mentioned above, such differences may be indicative of corresponding cancerous or precancerous regions of the patient's body. In particular for the Breast MR application, typically six to fourteen images are acquired at intervals of two to three minutes. Each image is a three-dimensional array of scalar values covering roughly the chest area of the patient. The output of the system is again a set of images (one for each input image) which are "motion-corrected". The input images are similar to one another but differ mainly because of three factors:

motion of the patient between acquisitions;
intensity modifications due to blood intake of an injected contrast agent; and
noise.

The output sequence is obtained by choosing a reference image from the input sequence and finding, for each of the remaining images, a spatial non-rigid deformation that, applied to the particular image considered, compensates for motion occurred with respect to the reference. This overall procedure is described in diagram FIG. 1 in a formal diagrammatic manner.

In accordance with an aspect of the invention, a method for motion compensation in first and second images in a temporal sequence by computing a deformation function comprises performing a conjugate gradient maximization of a similarity measure between the first and second images; and deriving the deformation function by utilizing the gradient maximization in conjunction with composition criteria so as to ensure non-singularity of the deformation function.

In accordance with another aspect of the invention, the conjugate gradient maximization is based on local cross-correlation of corresponding regions around each point in the images.

In accordance with another aspect of the invention the composition criteria comprise deriving the deformation function by composition of a plurality of regularized gradients of the similarity measure such that the deformation exhibits essentially no singularities.

In accordance with another aspect of the invention, the step of performing a conjugate gradient maximization comprises: deriving respective deformations by composition of a plurality of regularized gradients of the similarity measure for obtaining the deformation function.

In accordance with another aspect of the invention, the step of deriving the deformation function comprises applying the algorithm:

$$\begin{cases} \text{Let } U_0 = id \\ \text{For } k = 1 \cdots n: \\ \quad v_k = G_\sigma * \nabla S(I_1, I_2 \circ \phi_k) \\ \quad \phi_{k+1} = \phi_k \circ (id + \varepsilon_k v_k) \\ \text{End} \end{cases}$$

wherein operator $G_\sigma *$ denotes convolution by a Gaussian kernel,
S denotes the similarity measure,
$\nabla S$ denotes the gradient of S with respect to $\phi$,
$I_1 : \to R$ denotes the reference image,
$I_2 : \to R$ denotes the floating image,
$\phi : \Omega \to R^3$ denotes the deformation such that the similarity measure is maximized, and
$\circ$ denotes composition of functions, and $\epsilon_k$ is the step size, which is made sufficiently small to ensure invertibility.

In accordance with another aspect of the invention, the step of deriving a deformation comprises deriving a deformation by composition of displacements which are small as compared with the size of the images.

In accordance with another aspect of the invention, the step of deriving a deformation comprises deriving a deformation by composition of respective regularized gradients of the similarity measure.

In accordance with another aspect of the invention, the step of warping comprises computing the deformation composed with the floating image.

In accordance with another aspect of the invention, the step of warping comprises computing $(I_2 \circ \phi)(x)$, wherein $I_2 : \to R$ denotes the floating image, $\phi : \Omega \to R^3$ denotes the deformation such that the similarity measure is maximized, and $\circ$ denotes composition of functions.

In accordance with another aspect of the invention, the step of computing comprises utilizing tri-linear interpolation at each voxel of the floating image being warped.

In accordance with another aspect of the invention, the step of acquiring a reference image and a floating image comprises: utilizing a medical imaging technique, including any of magnetic resonance imaging (MRI), X-ray imaging, and CT scan imaging.

In accordance with another aspect of the invention, the step of obtaining a reference image and a floating image comprises: utilizing a medical imaging technique for detection of at least one of tumors and potential tumors in breast cancer.

In accordance with another aspect of the invention, the step of obtaining a reference image and a floating image comprises: utilizing a medical imaging technique for obtaining images indicating suspect tissue exhibiting at least one of (a) a more rapid intake or wash-in of contrast agent and (b) a more rapid washout than adjacent, non-tumor tissue.

In accordance with another aspect of the invention, a method comprises a step of utilizing the motion-corrected image to detect suspect tissue through comparison of images of a patient made before and after at least one of such wash-in and washout.

In accordance with another aspect of the invention the conjugate gradient maximization is based on local cross-correlation of corresponding regions around each point in the images.

In accordance with another aspect of the invention the composition criteria comprise deriving the deformation function by composition of a plurality of regularized gradients of the similarity measure such that the deformation exhibits essentially no singularities.

In accordance with another aspect of the invention, the step of performing a conjugate gradient maximization comprises: deriving respective deformations by composition of a plurality of regularized gradients of the similarity measure for obtaining the deformation function.

In accordance with another aspect of the invention, a method for performing image motion compensation between a reference image and an initial floating image by computing a deformation function from an initial deformation function comprises:
(a) setting the initial deformation function as a current deformation function;
(b) warping the initial floating image with the current deformation function so as to obtain a current warped floating image;
(c) computing a current similarity measure between the reference image and the current warped floating image;
(d) computing the current gradient of the current similarity measure with respect to the current deformation function;
(e) regularizing the current gradient so as to ensure its invertibility to obtain a current regularized gradient;
(f) (A) in the first performance of this step, setting the current regularized gradient as current conjugate gradient, and
  (B) in subsequent iterations of this step, conjugating the current regularized gradient with the current conjugate gradient so as to obtain a subsequent conjugate gradient;
(g) composing the subsequent conjugate gradient with the current deformation function so as to obtain a subsequent deformation function;
(h) setting the current deformation function as the subsequent deformation function;
(i) setting the current conjugate gradient as the subsequent conjugate gradient;
(j) going to step (b) and repeating until reaching a predetermined stop criterion; and
(k) defining the current warped floating image as a final warped floating image.

In accordance with another aspect of the invention, the stop criterion comprises reaching at least one of: a predetermined maximum number of repetitions or iterations of the recited sequence of steps; a predetermined lower limit for the gradient; zero for the gradient; and a predetermined processing time limit.

In accordance with another aspect of the invention, a method for performing image motion compensation between a reference image and an initial floating image by computing a deformation function from an initial deformation function method comprises:
(a) acquiring reference and initial floating images in a time sequence;
(b) setting the initial deformation function as a current deformation function;
(c) warping the initial floating image with the current deformation function so as to obtain a current warped floating image;
(d) computing a current similarity measure between the reference image and the current warped floating image;
(e) computing the current gradient of the current similarity measure with respect to the current deformation function;
(f) regularizing the current gradient so as to ensure its invertibility to obtain a current regularized gradient;
(g) setting the current regularized gradient as current conjugate gradient;
(h) composing the subsequent conjugate gradient with the current deformation function so as to obtain a subsequent deformation function;
(i) setting the current deformation function as the subsequent deformation function;
(j) setting the current conjugate gradient as the subsequent conjugate gradient;
(k) warping the initial floating image with the current deformation function so as to obtain a current warped floating image;
(l) computing a current similarity measure between the reference image and the current warped floating image;
(m) computing the current gradient of the current similarity measure with respect to the current deformation function;
(n) regularizing the current gradient so as to ensure its invertibility to obtain a current regularized gradient;

(o) conjugating the current regularized gradient with the current conjugate gradient so as to obtain a subsequent conjugate gradient;

(p) composing the subsequent conjugate gradient with the current deformation function so as to obtain a subsequent deformation function;

(q) setting the current deformation function as the subsequent deformation function;

(r) setting the current conjugate gradient as the subsequent conjugate gradient;

(s) going to step (k) and repeating until a predetermined stop criterion is reached; and (t) defining the current warped floating image as a final warped floating image.

In accordance with another aspect of the invention, the iterations begin at a low resolution level and proceed through increasingly higher resolutions.

In accordance with another aspect of the invention, the predetermined stop criterion comprises reaching at least one of: a predetermined maximum number of repetitions or iterations of the recited sequence of steps; a predetermined lower limit for the gradient; zero for the gradient; and a predetermined processing time limit.

In accordance with another aspect of the invention, the step of acquiring reference and initial floating images comprises: utilizing a medical imaging technique, including any of magnetic resonance imaging (MRI), X-ray imaging, and CT scan imaging.

In accordance with another aspect of the invention, the step of acquiring reference and initial floating images comprises: utilizing a medical imaging technique for detection of at least one of tumors and potential tumors in breast cancer.

In accordance with another aspect of the invention, the step of acquiring reference and initial floating images comprises: utilizing a medical imaging technique for obtaining images indicating suspect tissue exhibiting a more rapid intake or wash-in of contrast agent, as well as a more rapid washout than adjacent, non-tumor tissue.

In accordance with another aspect of the invention, the invention comprises a step of utilizing the motion-corrected final warped floating image to detect suspect tissue through comparison of images of a patient made before and after such wash-in and/or washout.

In accordance with another aspect of the invention, the invention comprises a step of utilizing the retrieving at least one of the images from any of: a storage medium, a computer, a radio link, the Internet, an infrared link, an acoustic link, a scanning device, and a live imaging device.

In accordance with another aspect of the invention, a method for performing image motion compensation comprises: acquiring a reference image and an initial floating image; warping the initial floating image with a given initial deformation function so as to obtain a current warped floating image; computing local cross-correlation between respective corresponding regions in the reference image and the warped floating image;

performing a conjugate gradient maximization of a similarity measure based on the local cross-correlation so as to derive a deformation function for which the similarity measure is maximal, by utilizing a combination of a conjugate gradient optimization with a composition of displacements which are small as compared with the size of the images whereby fast convergence is achieved while ensuring invertibility so that the deformation stays non-singular; and warping the floating image in accordance with the subsequent deformation function to obtain a motion-corrected image.

In accordance with another aspect of the invention, a method for performing image motion compensation comprises:

inputting a given temporal sequence of images, $I_1, \ldots I_i, \ldots I_n$;

selecting an image of the temporal sequence with index k as a reference image;

starting with i=1, then if i is not equal to k, performing a multi-resolution motion correction between $I_k$ and I by performing a conjugate gradient maximization of a similarity measure between first and second images in the temporal sequence;

deriving a deformation function by utilizing the gradient maximization in conjunction with composition criteria so as to ensure non-singularity of the deformation function;

warping one of the first and second images by the deformation function;

following such correction, defining $J_1$ as an output of the foregoing step of performing a multi-resolution motion correction;

in the event that i is equal to k, defining $J_i$ as $I_k$ and incrementing i by 1, comparing the incremented result with n:

in the event the incremented result is less than or equal to n, continuing to repeat the foregoing steps until the incremented result is greater than n, and thereupon terminating the steps, thereby resulting in a series of respective motion-corrected images, $J_1, J_2 \ldots J_n$.

In accordance with another aspect of the invention, the multi-resolution motion correction comprises:

determining a number of levels required for a multi-resolution pyramid;

constructing the multi-resolution pyramid with a lowest resolution top level, proceeding down in levels of increasing resolution;

initializing the deformation function to zero at the top level of the pyramid;

determining the deformation function, level by level down the pyramid, a current deformation function being determined within a current level based on initialization using the foregoing deformation function, and in accordance with the following steps:

if the current level is not the bottom level, then extrapolating the current deformation function to the next lower level, determining a deformation function at the next lower level; and when the bottom level of the pyramid is reached, then warping the floating image with the deformation function at the next lower level.

In accordance with another aspect of the invention, a method for performing image motion compensation between images in a temporal sequence by computing a deformation function from an initial deformation function, the method comprises:

(a) acquiring a reference image and an initial floating image;

(b) setting the initial deformation function as a current deformation function;

(c) warping the initial floating image with the current deformation function so as to obtain a current warped floating image;

(d) computing a current similarity measure between the reference image and the current warped floating image;
(e) computing the current gradient of the current similarity measure with respect to the current deformation function;
(f) regularizing the current gradient so as to ensure its invertibility to obtain a current regularized gradient;
(g) (A) in the first performance of this step, setting the current regularized gradient as current conjugate gradient, and
  (B) in subsequent iterations of this step, conjugating the current regularized gradient with the current conjugate gradient so as to obtain a subsequent conjugate gradient;
(h) composing the subsequent conjugate gradient with the current deformation function so as to obtain a subsequent deformation function;
(i) setting the current deformation function as the subsequent deformation function;
(j) setting the current conjugate gradient as the subsequent conjugate gradient;
(k) going to step (c) and repeating until a predetermined stop criterion is reached; and
(l) defining the current warped floating image as a final warped floating image.

In accordance with another aspect of the invention, a system for performing image motion compensation comprises:
a memory device for storing a program and other data; and
a processor in communication with the memory device, the processor operative with the program to perform:
  (a) setting the initial deformation function as a current deformation function;
  (b) warping the initial floating image with the current deformation function so as to obtain a current warped floating image;
  (c) computing a current similarity measure between the reference image and the current warped floating image;
  (d) computing the current gradient of the current similarity measure with respect to the current deformation function;
  (e) regularizing the current gradient so as to ensure its invertibility to obtain a current regularized gradient;
  (f) (A) in the first performance of this step, setting the current regularized gradient as current conjugate gradient, and
    (B) in subsequent iterations of this step, conjugating the current regularized gradient with the current conjugate gradient so as to obtain a subsequent conjugate gradient;
  (g) composing the subsequent conjugate gradient with the current deformation function so as to obtain a subsequent deformation function;
  (h) setting the current deformation function as the subsequent deformation function;
  (i) setting the current conjugate gradient as the subsequent conjugate gradient;
  (j) going to step (b) and repeating until reaching a predetermined stop criterion; and
  (k) defining the current warped floating image as a final warped floating image.

In accordance with another aspect of the invention, a computer program product comprises a computer useable medium having computer program logic recorded thereon for program code for performing image motion compensation by:
  (a) setting the initial deformation function as a current deformation function;
  (b) warping the initial floating image with the current deformation function so as to obtain a current warped floating image;
  (c) computing a current similarity measure between the reference image and the current warped floating image;
  (d) computing the current gradient of the current similarity measure with respect to the current deformation function;
  (e) regularizing the current gradient so as to ensure its invertibility to obtain a current regularized gradient;
  (f) (A) in the first performance of this step, setting the current regularized gradient as current conjugate gradient, and
    (B) in subsequent iterations of this step, conjugating the current regularized gradient with the current conjugate gradient so as to obtain a subsequent conjugate gradient;
  (g) composing the subsequent conjugate gradient with the current deformation function so as to obtain a subsequent deformation function;
  (h) setting the current deformation function as the subsequent deformation function;
  (i) setting the current conjugate gradient as the subsequent conjugate gradient;
  (j) going to step (b) and repeating until reaching a predetermined stop criterion; and
  (k) define the current warped floating image as a final warped floating image.

BRIEF DESCRIPTION OF THE DRAWINGS

The invention will be more fully understood from the detailed description of exemplary embodiments which follows, in conjunction with the drawings, in which.

DETAILED DESCRIPTION

Figure 1:
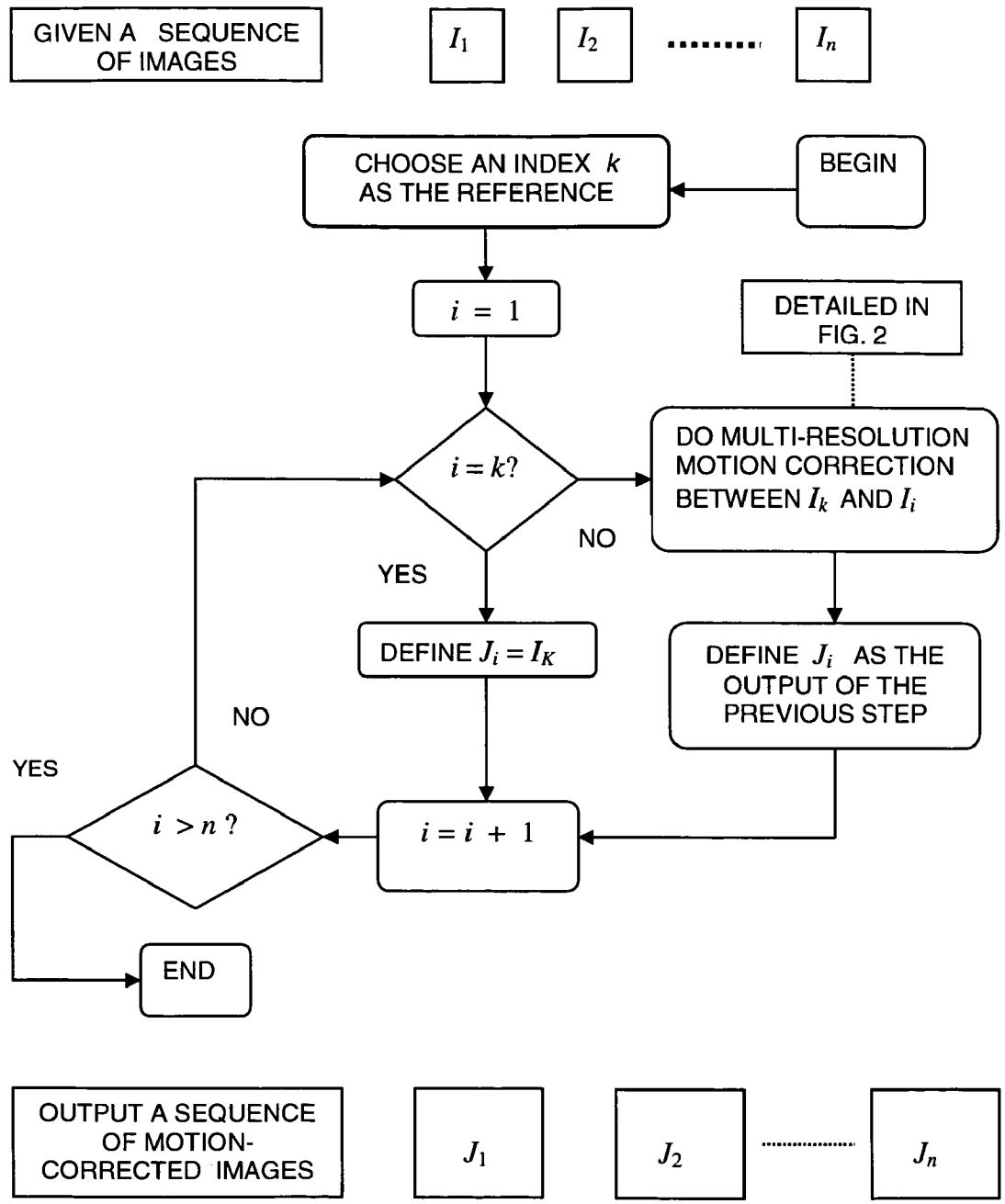
FIG. 1 shows, in flow chart format, motion correction from a temporal sequence of images in accordance with the principles of the invention.

In reference to FIG. 1, motion correction starts with a given temporal sequence of images, $I_1, \ldots I_i, \ldots I_n$; an image with index k is selected as a reference image. Starting with i=1, then if i is not equal to k, a multi-resolution motion correction is performed between $I_k$ and $I_i$, as will be explained in detail below and as is set forth in summary in FIG. 2. Following such correction, $J_1$ is defined as the output of the foregoing step of performing a multi-resolution motion correction.

In the event that i is equal to k, $J_i$ is defined as $I_k$ and i is incremented by 1, the incremented result being then compared with n: if the incremented result is less than or equal to n, the process continues until the incremented result is greater than n, whereupon the process is terminated. The foregoing process results in a series of respective motion-corrected images, $J_1, J_2 \ldots J_n$.

A more detailed description, including a multi-resolution technique follows next.

The input of the motion compensation module is a pair of images, one of which has been defined as the reference image as noted above, and the other being defined as a floating image, this being the image to which the compensating deformation is to be applied. The computations are performed using a multi-resolution scheme, which allows for large, global motions to be quickly recovered at low resolutions, bearing in mind that, as was previously mentioned, the images have general similarities. The deformation, or displacement, obtained at low resolution is used to initialize the search in the next finer resolution step. The deformation obtained at the finest or highest level of resolution is applied to the floating input image to yield the output, which is the desired motion corrected image.

Figure 2:
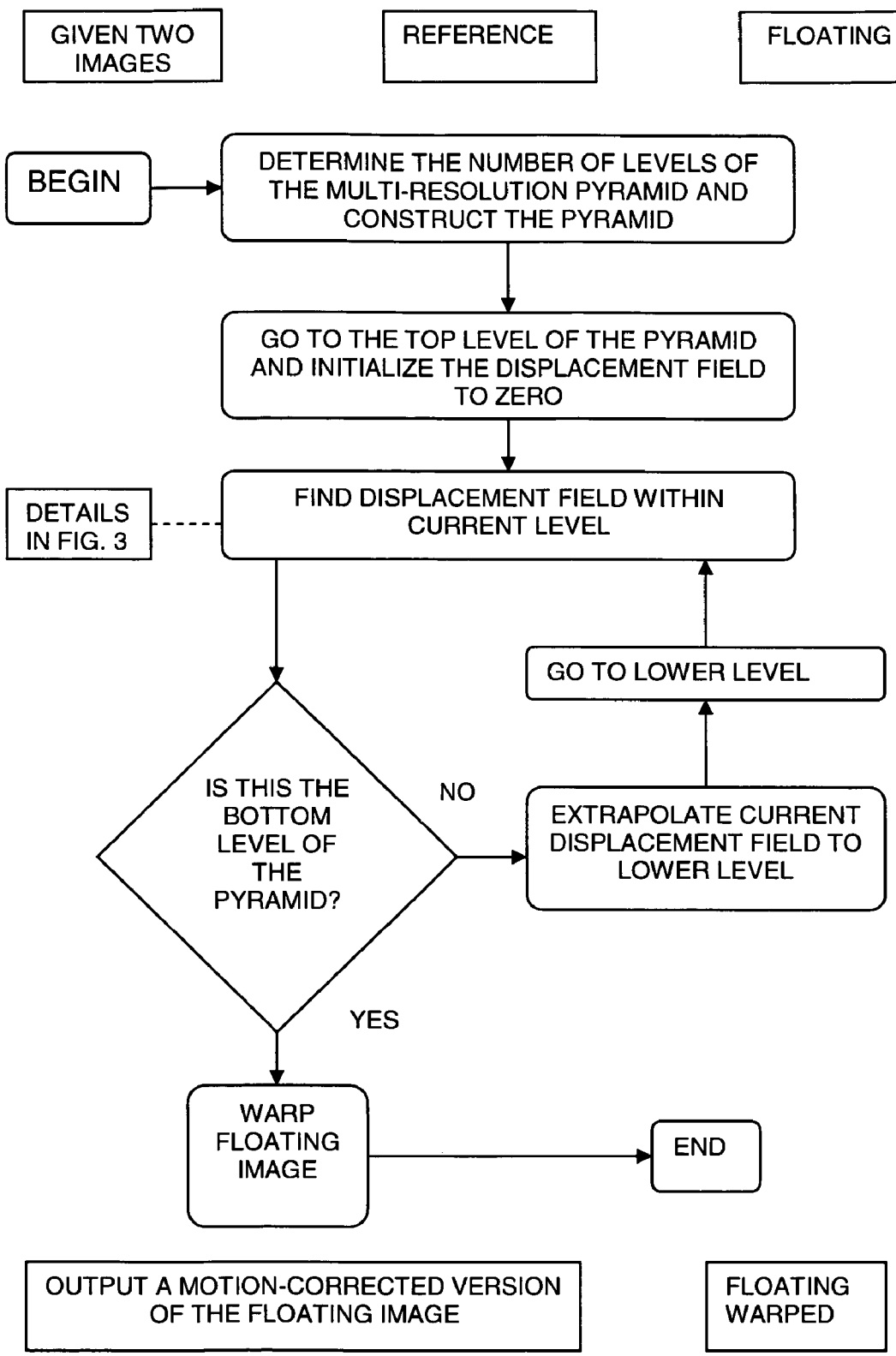
FIG. 2 shows, in flow chart format, multi-resolution motion correction procedural flow in accordance with the principles of the invention.

FIG. 2 shows steps for this part of the described embodiment of the present invention, starting with the reference and floating images. Initially, a determination is made of the number of levels required of the multi-resolution pyramid which is then constructed. The displacement field is initialized to zero at the top level of the pyramid, where the resolution is lowest. The displacement field is determined within the current level in accordance with the steps shown in FIG. 3 and as further described below. If the current level is not the bottom level, then the current displacement field is extrapolated to the next lower level wherein the displacement field is next determined as in the previous step. When the bottom level of the pyramid is reached, then the floating image is warped. FIG. 2 should also be referred to in conjunction with the more detailed description which follows this brief description of the steps shown in FIG. 2.

More particularly, since for Breast MR images the number of planes (or slices) is usually much smaller than the number of columns or rows of each slice, only the size of the planes is reduced in the construction of the multi-resolution pyramid. This is done using a low-pass filter which is specially designed for reducing in half the sampling frequency with minimal loss of information when the size of the plane is reduced by omitting pixels.

Results are then extrapolated from the lower resolution levels. Thus, the motion estimated at a particular resolution is used as an initial estimate in the next finer level of resolution. This is done by re-sampling each component of the displacement field at twice the frequency using tri-linear interpolation. See the general definitions below in the subsections providing details on specific modules and operations used by the algorithm. The applicable general definitions are given below. For material on linear interpolation see, for example, the aforementioned textbook by Gonzalez, pp. 64 et seq.

Motion estimation is carried out within the terms of a single resolution. The estimation of the compensating deformation between a reference and a floating image within a given resolution level is a component of the system, preparatory to the subsequent steps to be further described below. It is done by performing a conjugate gradient maximization of a similarity measure between the two images, based on the local cross-correlation of corresponding regions around each point. The non-singularity of the deformation is ensured by a special composition technique when building the solution, as will be further explained below.

Figure 3:
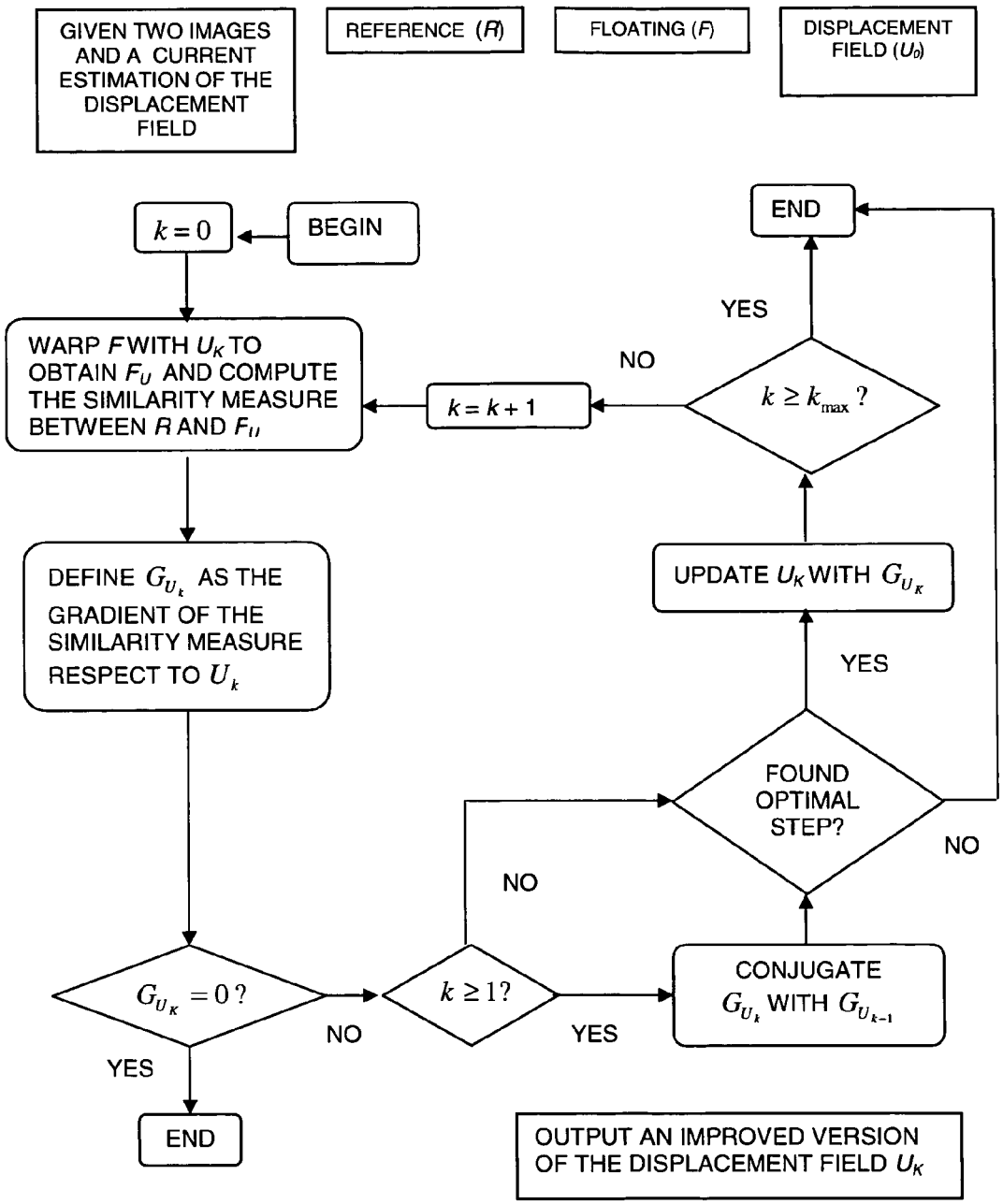
FIG. 3 shows, in flow chart format, estimation of the displacement field between two images in accordance with the principles of the invention.

The flow diagram of the algorithm for the estimation of the displacement field between two images is depicted in FIG. 3, wherein the input quantities are a Reference image (R) and a Floating image (F), and a current estimation of the displacement field ($U_0$). The steps will be explained in greater detail, following the present description of FIG. 3. The index k is initially at zero. F is warped with $U_k$ to obtain $F_U$ and compute the similarity measure between U and $F_U$. For further details, see below, in the sections on warping, updating procedure, and computation of the local cross-correlation and its gradient. In the following step, $G_U$ is defined as the gradient of the similarity measure with respect to $U_k$. See the section on computation of the local cross-correlation and its gradient below. If $G_U$ is not zero and k is equal to or greater than 1, then $G_{U_k}$ is conjugated with $G_{U_{k-1}}$, then a determination is made using the conjugation of $G_{U_k}$ with $G_{U_{k-1}}$ as to whether an optimal step has been found, where optimal is used in the sense relating to an "optimal-step" type of gradient descent where the descent path leads directly to a local minimum. For further details, see the section below on conjugate gradient optimization. If an optimal step has not been found, the process terminates. If an optimal step has been found, then $U_k$ is updated with $G_{U_k}$ and a determination is made as to whether $k \geq k_{max}$. For further details, see the section below on updating procedure. If $k \geq k_{max}$, then this portion of the process is ended. If not, then k is incremented by 1 and, using the incremented value of k, F is warped with $U_k$ to obtain $F_U$, followed again by the steps set forth above for computing the similarity measure, and so forth. If $G_U$ is equal to zero, the process ends, the output being an improved version $U_k$ of the displacement field.

The following subsections provide details on specific modules and operations used by the algorithm. Listings of special mathematical symbols may be found in a number of mathematical textbooks such as, for example, *Mathematics Handbook for Science and Engineering*, by Lennart Råde and Bertil Westergren; Birkhäuser Boston, 1995; pp. 522-523; and *A Survey of Modern Algebra*, by Garrett Birkhoff and Saunders Mac Lane; A K Peters, Ltd., 1997; pp. 486-488.

The two input images are denoted as $I_1:\Omega \rightarrow R$ and $I_2:\rightarrow R$, which means they are to be considered as functions from a domain $\Omega \subset R^3$ of Euclidean three-dimensional space into the set of real numbers R. At a point $x \in \Omega$, the pair of values (intensities) of these functions will be denoted as $$I(x) \equiv [I_1(x), I_2(x)].$$

The goal of the motion correction component is to find a deformation $\phi:\Omega \rightarrow R^3$ such that the similarity measure S (defined hereinbelow) between $I_1$ and $I_2 \circ \phi$ is maximized. Here $\circ$ denotes composition of functions, that is $$(I_2 \circ \phi)(x) \equiv I_2(\phi(x)).$$

To each deformation $\phi$ we associate a displacement field $U:\Omega \rightarrow R^3$ such that $\phi = id + U$, i.e. $\phi(x) = x + \phi(x)$, $\forall x \in \Omega$. In other words, the motion correction module tries to find a displacement field U (which is a volume of three-dimensional vectors) that makes $S(I_1, I_2 \circ \phi)$ maximal. (In accordance with common usage, $\forall$ is the universal quantifier, where $\forall x$ means "For all x, ... ")

Warping is the operation of computing $(I_2 \circ \phi)$ (X). It requires tri-linear interpolation at each voxel of the image to be warped. See the box "Warp floating image" in FIG. 2. With regard to the updating procedure, the principle herein is: $\phi$ is explicitly obtained by composition of small displacements. Each small displacement $v_k$ is the regularized gradient of the similarity measure S between $I_1$ and $I_2 \circ \phi_k$.

The present invention makes use of a known mathematical property of invertible deformations, namely, that the composition of invertible deformations results in an overall deformation which is itself invertible, to obtain appropriate deformation of an image for motion correction and utilizes deformation steps that are kept sufficiently small to avoid problems with singularities. Composition has been defined above and is represented by the symbol $\circ$.

Referring again to FIG. 3 for the estimation of the displacement field between two images, the applicable algorithm is:

$$\begin{cases} \text{Let } U_0 = id \\ \text{For } k = 1 \cdots n: \\ \quad v_k = G_\sigma * \nabla S(I_1, I_2 \circ \phi_k) \\ \quad \phi_{k+1} = \phi_k \circ (id + \varepsilon_k v_k) \\ \text{End} \end{cases}$$

The operator $G_\sigma *$ denotes convolution by a Gaussian kernel, whereas $\nabla S$ denotes the gradient of S with respect to $\phi$ (see below), and $\varepsilon_k$ is the step size, which is made sufficiently small to ensure invertibility.

Regarding the computation of the local cross-correlation and its gradient, which is essentially in accordance with the algorithm set forth above, the results in this section are represent a condensation of the more extensive description to be found in the publication by the present inventor, herein incorporated by reference, as follows:

Gerardo Hermosillo, *Variational Methods for Multimodal Image Matching*, PhD thesis, INRIA;

the document is also accessible at:

ftp://ftp-sop.inria.fr/robotvis/html/Papers/hermosillo: 02.ps.gz, 2002.

The local cross-correlation between $I_1$ and $I_2$ is defined by $$J_{CC} = \int_\Omega J_{CC}(x)dx = \int_\Omega \frac{v_{1,2}(x)^2}{v_1(x)v_2(x)}dx,$$

where $v_{1,2}(x)$, $v_1(x)$ and $v_2(x)$ are respectively the covariance and variances of the intensities of $I_1$ and $I_2$ around x. Its first order variation is well defined and defines a gradient given by $$\nabla J_{CC}(x) = f_{CC}(I(x), x) \nabla I_2(x),$$

where $$f_{CC}(i, x) = G_\gamma * L_{CC}(i, x), \text{ and}$$

$$L_{CC}(i, x) = \frac{v_{1,2}(x)}{v_2(x)}\left(\frac{i_1 - \mu_1(x)}{v_1(x)}\right) + J_{CC}(x)\left(\frac{i_2 - \mu_2(x)}{v_2(x)}\right). \quad (1)$$

The function $L_{CC}$ is estimated as $$L_{CC}(i, x) = (G_\gamma * f_1)(x)i_1 + (G * f_2)(x)i_2 + (G_\gamma * f_3)(x),$$

where $$f_1(x) = \frac{v_{1,2}(x)}{v_1(x)v_2(x)}, \quad f_2(x) = \frac{J_{CC}(x)}{v_2(x)}, \text{ and}$$

$$f_3(x) = f_1(x)\mu_1(x) + f_2(x)\mu_2(x)$$

All the required space dependent quantities like $\mu_1(x)$ are computed by convolution with a Gaussian kernel (see below).

As concerns the conjugate gradient optimization, the explicit time discretization using a fixed time step corresponds to a steepest descent method without line search, which is generally quite inefficient. The system in accordance with the present invention performs line searching such that the step is optimal, and it uses a Fletcher-Reeves conjugate gradient minimization routine, essentially as described in the book William H. Press et al.: *Numerical recipes in C*, Cambridge University Press, 1988, to which reference is made for further details of this classical mathematical routine.

The conjugate gradient method allows about one order of magnitude reduction in the total number of iterations required. The gain in speed is much higher since the number of iterations at the finest level is very small, despite the fact that each iteration is slightly more costly.

The convolutions by a Gaussian kernel are approximated by recursive filtering using the smoothing operator introduced in R. Deriche, *Fast algorithms for low-level vision*, IEEE Transactions on Pattern Analysis and Machine Intelligence, 1(12):78-88, January 1990. conjugate gradient method Given a discrete ID input sequence $x(n)$, $n=1, \ldots, M$, its convolution by the smoothing operator $S_\alpha(n)=k(\alpha|n|+1)e^{-\alpha|n|}$ is calculated efficiently as:

$$y(n) = (S_\alpha * x)(n) = y_1(n) + y_2(n)$$

where $$\begin{cases} y_1(n) = \begin{array}{l} k(x(n) + e^{-\alpha}(\alpha - 1)x(n - 1)) + \\ 2e^{-\alpha}y_1(n - 1) - e^{-2\alpha}y_1(n - 2), \end{array} \\ y_2(n) = \begin{array}{l} k(e^{-\alpha}(\alpha + 1)x(n + 1) - e^{-2\alpha}x(n + 2)) + \\ 2e^{-\alpha}y_2(n + 1) - e^{-2\alpha}y_2(n + 2) \end{array} \end{cases}$$

The normalization constant k is chosen by requiring that $\int^R S_\alpha(t)dt=1$, which yields $k+\alpha/4$.

This scheme is very efficient since the number of operations required is independent of the smoothing parameter $\alpha$. The smoothing filter can be readily generalized to n dimensions by defining the separable filter $$T_\alpha(x) = \prod_{i=1}^n S_\alpha(x_i).$$

Figure 4:
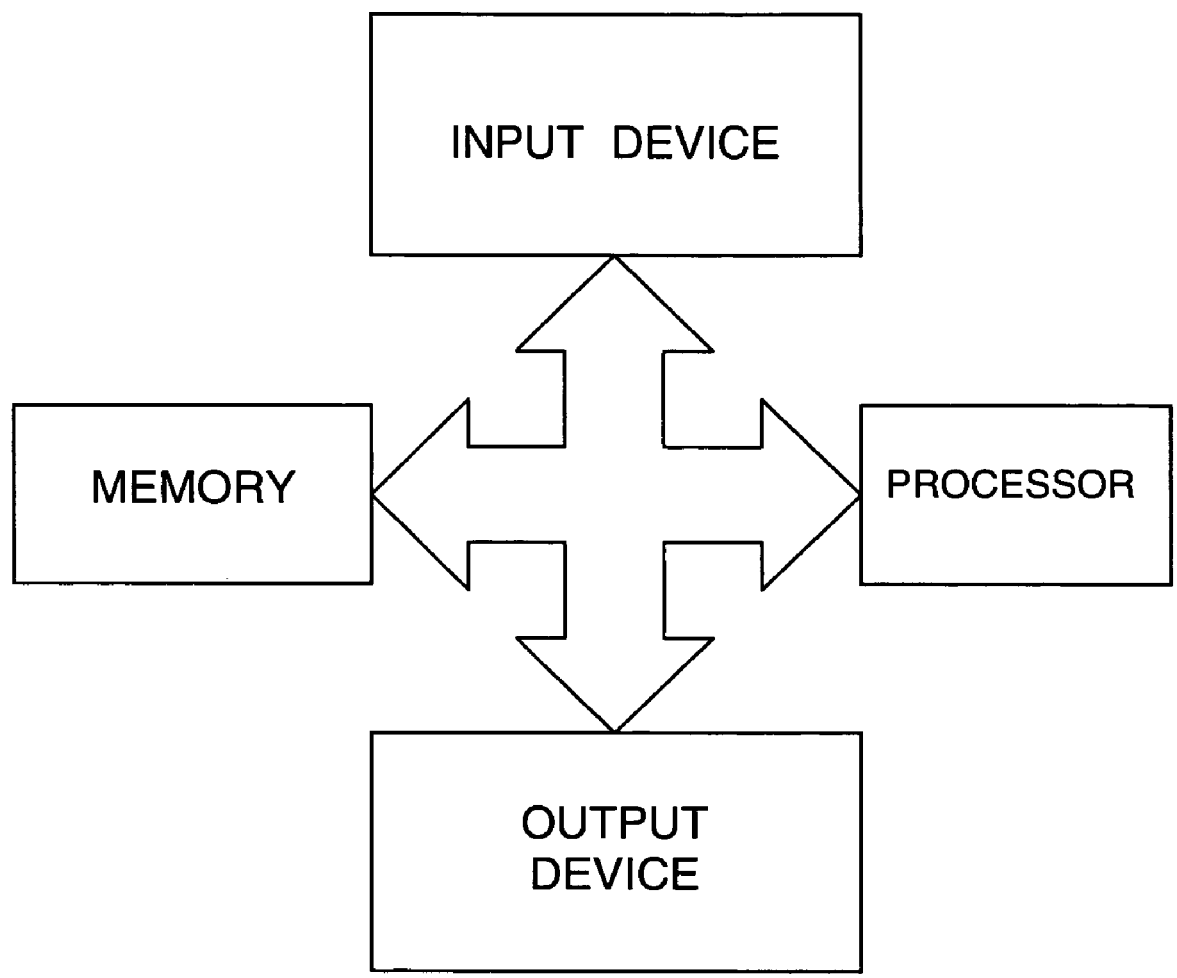
FIG. 4 shows in schematic form the application of a programmable digital computer for implementation of the invention.

As will be apparent, the present invention is intended to be implemented with the use and application of a programmed digital computer. FIG. 4 shows in basic schematic form a digital processor coupled for two way data communication with an input device, an output device, and a memory device for storing a program and other data. The input device is so designated in broad terms as a device for providing an appropriate image or images for processing in accordance with the present invention. For example, the input may be from an imaging device, such as a device incorporated in a CATSCAN, X-ray machine, an MRI or other device, or a stored image, or by communication with another computer or device by way of direct connection, a modulated infrared beam, radio, land line, facsimile, or satellite as, for example, by way of the World Wide Web or Internet, or any other appropriate source of such data. The output device may include a computer type display device using any suitable apparatus such as a cathode-ray kinescope tube, a plasma display, liquid crystal display, and so forth, or it may or may not include a device for rendering an image and may include a memory device or part of the memory device of FIG. 4 for storing an image for further processing, or for viewing, or evaluation, as may be convenient, or it may utilize a connection or coupling including such as are noted above in relation to the input device. The processor is operative with a program set up in accordance with the present invention for implementing steps of the invention. Such a programmed computer may interface readily through communications media such as land line, radio, the Internet, and so forth for image data acquisition and transmission.

The invention may be readily implemented, at least in part, in a software memory device and packaged in that form as a software product. This can be in the form of a computer program product comprising a computer useable medium having computer program logic recorded thereon for program code for performing image motion compensation utilizing the method of the present invention.

While the present invention has been explained by way of examples using illustrative exemplary embodiments relating to motion compensation in a temporal sequence of images in MR detection of potential tumors of the human breast, the invention is also generally applicable to the solution of problems requiring spatial alignment in other fields such as, but not limited to, the example of PET-CT registration.

It will be understood that the description by way of exemplary embodiments is not intended to be limiting and that various changes and substitutions not herein explicitly described may be made without departing from the spirit of the invention whose scope is defined by the claims following.

What is claimed is:

1. A method for motion compensation in first and second images in a temporal sequence by computing a deformation function, said method comprising:

using a computer to performing a conjugate gradient maximization of a similarity measure between said first and second images; and deriving said deformation function by utilizing said gradient maximization in conjunction with composition of a plurality of regularized gradients of said similarity measure such that said deformation function exhibits essentially no singularities, wherein said step of deriving said deformation function comprises applying an algorithm to update a displacement field between said images, comprising:

field between said images, comprising:

$$\begin{cases} \text{Let } U_0 = id \\ \text{For } k = 1 \cdots n: \\ \quad v_k = G_\sigma * \nabla S(I_1, I_2 \circ \phi_k) \\ \quad \phi_{k+1} = \phi_k \circ (id + \varepsilon_k v_k) \\ \text{End} \end{cases}$$

wherein $U_0$ denotes a current estimation of said displacement field, id denotes an identity function, k denotes an index, $V_k$ denotes a regularized gradient of said similarity measure, operator $G_\sigma^*$ denotes convolution by a Gaussian kernel, S denotes the similarity measure, $\nabla S$ denotes the gradient of S with respect to $\phi$, $I_1: \to R$ denotes said first image, $I_2: \to R$ denotes said second image, $\phi: \Omega \to R^3$ denotes said deformation such that said similarity measure is maximized, $\circ$ denotes composition of functions, and $\epsilon_k$ is the step size, which is made sufficiently small to ensure invertibility.

2. A method in accordance with claim 1, wherein said conjugate gradient maximization is based on local cross-correlation of corresponding regions around each point in said images.

3. A method in accordance with claim 1 further comprising warping said second image with said deformation function to obtain a motion-corrected image.

4. A method in accordance with claim 3 wherein said conjugate gradient maximization is based on local cross-correlation of corresponding regions around each point in said images.

5. A method in accordance with claim 3, said step of warping comprises computing said deformation function composed with said second image.

6. A method in accordance with claim 5, wherein said step of warping comprises computing $(I_2 \circ \phi)(x)$, wherein $I_2: \to R$ denotes said second image, $\phi: \Omega \to R^3$ denotes said deformation such that said similarity measure is maximized, and $\circ$ denotes composition of functions.

7. A method in accordance with claim 6, wherein said step of computing comprises utilizing tri-linear interpolation at each voxel of said second image being warped.

8. A method in accordance with claim 7, wherein said conjugate gradient maximization is based on local cross-correlation of corresponding regions around each point in said images.

9. A method in accordance with claim 3, further comprising a step of utilizing said motion-corrected image to detect suspect tissue through comparison of images of a patient made before and after at least one of wash-in and washout of contrast agent.

10. A method in accordance with claim 9, wherein said conjugate gradient maximization is based on local cross-correlation of corresponding regions around each point in said images.

11. A method in accordance with claim 1, wherein said step of deriving a deformation comprises deriving a deformation by composition of displacements which are small as compared with the size of said images.

12. A method in accordance with claim 11, wherein said conjugate gradient maximization is based on local cross-correlation of corresponding regions around each point in said images.

13. A method in accordance with claim 1, wherein said conjugate gradient maximization is based on local cross-correlation of corresponding regions around each point in said images.

14. A method in accordance with claim 1 further comprising a step of acquiring said first image and said second image, wherein said step of acquiring comprises:

utilizing a medical imaging technique, including any of magnetic resonance imaging (MRI), X-ray imaging, and CT scan imaging.

15. A method in accordance with claim 1 further comprising a step of acquiring said first image and said second image, wherein said step of acquiring comprises:

utilizing a medical imaging technique for detection of at least one of tumors and potential tumors in breast cancer.

16. A method in accordance with claim 1 further comprising a step of acquiring said first image and said second image, wherein said step of acquiring comprises:

utilizing a medical imaging technique for obtaining images indicating suspect tissue exhibiting at least one of (a) a more rapid intake or wash-in of contrast agent and (b) a more rapid washout than adjacent, non-tumor tissue.

17. A method for performing image motion compensation between a reference image and an initial floating image by computing a deformation function from an initial deformation function, said method comprising:
- (a) setting said initial deformation function as a current deformation function;
- (b) warping said initial floating image with said current deformation function so as to obtain a current warped floating image;
- (c) using a computer to compute a current similarity measure between said reference image and said current warped floating image;
- (d) computing using a computer to compute the current gradient of said current similarity measure with respect to said current deformation function;
- (e) regularizing said current gradient so as to ensure its invertibility to obtain a current regularized gradient;
- (f) (A) in the first performance of this step, setting said current regularized gradient as current conjugate gradient, and
  - (B) in subsequent iterations of this step, conjugating said current regularized gradient with said current conjugate gradient so as to obtain a subsequent conjugate gradient;
- (g) composing said subsequent conjugate gradient with said current deformation function so as to obtain a subsequent deformation function;
- (h) setting said current deformation function as said subsequent deformation function;
- (i) setting said current conjugate gradient as said subsequent conjugate gradient;
- (j) going to step (b) and repeating until reaching a predetermined stop criterion; and
- (k) defining the current warped floating image as a final warped floating image.

18. A method in accordance with claim 17, wherein said iterations begin at a low resolution level and proceed through increasingly higher resolutions.

19. A method in accordance with claim 17, wherein said stop criterion comprises reaching at least one of:
- a predetermined maximum number of repetitions or iterations of the recited sequence of steps;
- a predetermined lower limit for said gradient;
- zero for said gradient; and
- a predetermined processing time limit.

20. A method for performing image motion compensation between a reference image and an initial floating image by computing a deformation function from an initial deformation function, said method comprising:
- (a) acquiring reference and initial floating images in a time sequence;
- (b) setting said initial deformation function as a current deformation function;
- (c) warping said initial floating image with said current deformation function so as to obtain a current warped floating image;
- (d) computing using a computer to compute a current similarity measure between said reference image and said current warped floating image;
- (e) using a computer to compute the current gradient of said current similarity measure with respect to said current deformation function;
- (f) regularizing said current gradient so as to ensure its invertibility to obtain a current regularized gradient;
- (g) setting said current regularized gradient as a current conjugate gradient and conjugating said current regularized gradient with said current conjugate gradient so as to obtain a subsequent conjugate gradient;
- (h) composing said subsequent conjugate gradient with said current deformation function so as to obtain a subsequent deformation function;
- (i) setting said current deformation function as said subsequent deformation function;
- (j) setting said current conjugate gradient as said subsequent conjugate gradient;
- (k) warping said initial floating image with said current deformation function so as to obtain a current warped floating image;
- (l) computing a current similarity measure between said reference image and said current warped floating image;
- (m) computing the current gradient of said current similarity measure with respect to said current deformation function;
- (n) regularizing said current gradient so as to ensure its invertibility to obtain a current regularized gradient;
- (o) conjugating said current regularized gradient with said current conjugate gradient so as to obtain a subsequent conjugate gradient;
- (p) composing said subsequent conjugate gradient with said current deformation function so as to obtain a subsequent deformation function;
- (q) setting said current deformation function as said subsequent deformation function;
- (r) setting said current conjugate gradient as said subsequent conjugate gradient;
- (s) going to step (k) and repeating until a predetermined stop criterion is reached; and
- (t) defining the current warped floating image as a motion-corrected final warped floating image.

21. A method in accordance with claim 20, wherein said iterations begin at a low resolution level and proceed through increasingly higher resolutions.

22. A method in accordance with claim 20, wherein said predetermined stop criterion comprises reaching at least one of:
- a predetermined maximum number of repetitions or iterations of the recited sequence of steps;
- a predetermined lower limit for said gradient; zero for said gradient; and a predetermined processing time limit.

23. A method in accordance with claim 20, wherein said step of acquiring reference and initial floating images comprises:
- utilizing a medical imaging technique, including any of magnetic resonance imaging (MRI), X-ray imaging, and CT scan imaging.

24. A method in accordance with claim 20, wherein said step of acquiring reference and initial floating images comprises:
- utilizing a medical imaging technique for detection of at least one of tumors and potential tumors in breast cancer.

25. A method in accordance with claim 20, wherein said step of acquiring reference and initial floating images comprises:
- utilizing a medical imaging technique for obtaining images indicating suspect tissue exhibiting a more rapid intake or wash-in of contrast agent, as well as a more rapid washout than adjacent, non-tumor tissue.

26. A method in accordance with claim 25, comprising a step of utilizing said motion-corrected final warped floating image to detect suspect tissue through comparison of images of a patient made before and after such wash-in and/or washout.

27. A method in accordance with claim 26, comprising a step of utilizing said motion-corrected final warped floating image to detect suspect tissue through comparison of images of a patient made before and after at least one of such wash-in and washout.

28. A method in accordance with claim 25, comprising a step of utilizing said retrieving at least one of said images from any of: a storage medium, a computer, a radio link, the Internet, an infrared link, an acoustic link, a scanning device, and a live imaging device.

29. A method for performing image motion compensation, comprising:
acquiring a reference image and an initial floating image;
warping said initial floating image with a given initial deformation function so as to obtain a current warped floating image;
using a computer to compute local cross-correlation between respective corresponding regions in said reference image and said warped floating image;
performing a conjugate gradient maximization of a similarity measure based on said local cross-correlation so as to derive a deformation function for which said similarity measure is maximal, by utilizing a combination of a conjugate gradient optimization with a composition of displacements which are small as compared with the size of said images whereby fast convergence is achieved while ensuring invertibility so that said deformation function stays non-singular; and
warping said floating image in accordance with said deformation function to obtain a motion-corrected image;
wherein said step of deriving a deformation function comprises applying an algorithm to update a displacement filed between said images, comprising:

$$\begin{cases} \text{Let } U_0 = id \\ \text{For } k = 1 \cdots n: \\ \quad v_k = G_\sigma * \nabla S(I_1, I_2 \circ \phi_k) \\ \quad \phi_{k+1} = \phi_k \circ (id + \varepsilon_k v_k) \\ \text{End} \end{cases}$$

wherein $U_0$ denotes a current estimation of said displacement field,
id denotes an identity function,
k denotes an index,
$V_k$ denotes a regularized gradient of said similarity measure,
operator $G_\sigma*$ denotes convolution by a Gaussian kernel,
S denotes the similarity measure,
$\nabla S$ denotes the gradient of S with respect to $\phi$,
$I_1: \to R$ denotes said first image,
$I_2: \to R$ denotes said second image,
$\phi:\Omega \to R^3$ denotes said deformation such that said similarity measure is maximized, and $\circ$ denotes composition of functions, and
$\epsilon_k$ is the step size, which is made sufficiently small to ensure invertibility.

30. A method in accordance with claim 29, comprising:
initializing said initial deformation function at the top level of a multi-resolution pyramid having a given number of progressively decreasing image resolution levels, with the lowest resolution level being at the top;
extrapolating said initial deformation function to the next lower level;
determining a next lower deformation function at said next lower level;
if said next lower level is the lowest level, then warping said floating image using a deformation function determined at said lowest level, and if not,
then performing a cycle of steps comprising:
extrapolating said next lower deformation function to a next yet lower level, and
determining a yet lower deformation function at said yet lower level,
repeatedly as needed until the lowest level is reached; and
warping said floating image using a deformation function determined at said lowest level.

31. A method in accordance with claim 29, comprising:
forming said progressively decreasing resolution levels by progressively reducing the size of image planes used in forming said levels.

32. A method in accordance with claim 31, comprising:
progressively reducing the size of said image planes by using a low-pass filter for reducing in half the sampling frequency for said image planes.

33. A method in accordance with claim 31, wherein said step of performing a conjugate gradient maximization of said similarity measure comprises utilizing a combination of a conjugate gradient optimization with a composition of displacements which are small as compared with the size of said images whereby fast convergence is achieved while ensuring that said deformation stays nonsingular.

34. A method in accordance with claim 31, wherein said step of performing a conjugate gradient maximization of said similarity measure comprises utilizing a combination of a conjugate gradient optimization with a composition of displacements which are small as compared with the size of said images, whereby fast convergence is achieved while ensuring that said deformation stays nonsingular.

35. A method in accordance with claim 31, wherein said step of performing a conjugate gradient maximization of said similarity measure comprises utilizing a combination of a conjugate gradient optimization with composition of respective regularized gradients of said similarity measure, whereby fast convergence is achieved while ensuring that said deformation stays nonsingular.

36. A method in accordance with claim 29, wherein said step of deriving a deformation comprises deriving a deformation exhibiting no singularities.

37. A method in accordance with claim 29, wherein said step of deriving a deformation comprises deriving a deformation by composition of displacements which are small as compared with the size of said images.

38. A method in accordance with claim 29, wherein said step of deriving a deformation comprises deriving a deformation by composition of respective regularized gradients of said similarity measure.

39. A method in accordance with claim 29, wherein said step of warping comprises computing said deformation composed with said floating image.

40. A method in accordance with claim 29, wherein said step of warping comprises computing $(I_2 \circ \phi)(x)$, wherein $I_2: \to R$ denotes said floating image, $\phi:\Omega \to R^3$ denotes said deformation such that said similarity measure is maximized, and $\circ$ denotes composition of functions.

41. A method in accordance with claim 40, wherein said step of computing comprises utilizing tri-linear interpolation at each voxel of said floating image being warped.

42. A method in accordance with claim 29, wherein said step of acquiring a reference image and a floating image comprises:

utilizing a medical imaging technique, including any of magnetic resonance imaging (MRI), X-ray imaging, and CT scan imaging.

43. A method in accordance with claim 29, wherein said step of acquiring a reference image and a floating image comprises:
utilizing a medical imaging technique for detection of at least one of tumors and potential tumors in breast cancer.

44. A method in accordance with claim 29, wherein said step of acquiring a reference image and a floating image comprises:
utilizing a medical imaging technique for obtaining images indicating suspect tissue exhibiting at least one of (a) a more rapid intake (wash-in) of contrast agent and (b) a more rapid washout than adjacent, non-tumor tissue.

45. A computer readable medium having a computer program logic recorded thereon for program code for performing image motion compensation, comprising by:
inputting a given temporal sequence of images, $I_1, \ldots I_2, \ldots I_n$;
selecting an image of said temporal sequence with index k as a reference image;
starting with i=1, then if i is not equal to k,
performing a multi-resolution motion correction between $I_k$ and I by performing a conjugate gradient maximization of a similarity measure between first and second images in said temporal sequence;
deriving a deformation function by utilizing said gradient maximization in conjunction with composition of a plurality of regularized gradients of said similarity measure such that said deformation function exhibits essentially no singularities;
warping one of said first and second images by said deformation function;
following such correction, defining $J_1$ as an output of the foregoing step of performing a multi-resolution motion correction until:
in the event that i is equal to k,
defining $J_i$ as $I_k$ and incrementing i by 1,
comparing the incremented result with n:
in the event the incremented result is less than or equal to n,
continuing to repeat the foregoing steps until the incremented result is greater than n, and thereupon terminating said steps, thereby resulting in a series of respective motion-corrected images, $J_1, J_2 \ldots J_n$.

46. The computer readable medium in accordance with claim 45, wherein said multi-resolution motion correction comprises:
determining a number of levels required for a multi-resolution pyramid;
constructing said multi-resolution pyramid with a lowest resolution top level, proceeding down in levels of increasing resolution;
initializing said deformation function to zero at the top level of said pyramid;
determining said deformation function, level by level down said pyramid, a current deformation function being determined within a current level based on initialization using the foregoing deformation function, and in accordance with the following steps:
if said current level is not the bottom level, then extrapolating said current
deformation function to the next lower level,
determining a deformation function at said next lower level; and when said bottom level of the pyramid is reached, then warping said floating image with said deformation function at said next lower level.

47. The computer readable medium in accordance with claim 46, wherein said step of determining said deformation function comprises:
computing local cross-correlation between regions in said reference image and corresponding respective regions in said floating image;
determining a similarity measure between said reference image and said floating image; and
performing a conjugate gradient maximization of said similarity measure based on said local cross-correlation so as to derive a deformation function for which said similarity measure is maximal.

48. A method in accordance with claim 47, comprising:
performing said local cross-correlation between images $I_1$ and $I_2$ in accordance with the following:

$$J_{CC} = \int_\Omega J_{CC}(x)dx = \int_\Omega \frac{v_{1,2}(x)^2}{v_1(x)v_2(x)}dx,$$

where $v_{1,2}(X)$, $v_1(x)$ and $v_2(x)$ are respectively the covariance and variances of the intensities of $I_1$ and $I_2$ around x; whereof the first order variation defines a gradient given by $$\nabla J_{CC}(x) = f_{CC}(I(x), x)\nabla I_2(x),$$

where $$f_{CC}(i, x) = G_\gamma * L_{CC}(i, x), \text{ and}$$

$$L_{CC}(i, x) = \frac{v_{1,2}(x)}{v_2(x)}\left(\frac{i_1 - \mu_1(x)}{v_1(x)}\right) + J_{CC}(x)\left(\frac{i_2 - \mu_2(x)}{v_2(x)}\right),$$

wherein
function $L_{cc}$ is estimated as $$L_{CC}(i, x) = (G_\gamma * f_1)(x)i_1 + (G * f_2)(x)i_2 + (G_\gamma * f_3)(x),$$

where $$f_1(x) = \frac{v_{1,2}(x)}{v_1(x)v_2(x)},$$

$$f_2(x) = \frac{J_{CC}(x)}{v_2(x)}, \text{ and}$$

$$f_3(x) = f_1(x)\mu_1(x) + f_2(x)\mu_2(x);$$

and
all required space dependent quantities including $\mu_1(x)$ are computed by convolution with a Gaussian kernel.

49. The computer readable medium in accordance with claim 46, wherein said step of determining said deformation function comprises:
assigning the initial value of k as zero;
warping F with U to obtain F;
computing the similarity measure between U and F;
defining G as the gradient of the similarity measure with respect to $U_k$;
if $G_U$ is not zero and k is equal to or greater than 1, then conjugating $G_{Uk}$ with $G_{Uk-1}$;
determining, using the conjugation of $G_{Uk}$ with $G_{Uk-1}$, whether an optimal step has been found;

if an optimal step has been found, then updating $U_k$ with $G_{U_k}$;

determining whether $k \geq k_{max}$;

if $k \geq k_{max}$, the process is ended, and if not, then k is incremented by 1;

using the incremented value of k, warping F with $U_k$ to obtain $F_U$, following again with the foregoing steps for computing the similarity measure, and so forth; and if $G_U$ is equal to zero, then ending the process, whereby the output is an improved version $U_k$ of the deformation function.

50. The computer readable medium in accordance with claim 46, wherein said step of constructing said multi-resolution pyramid comprises:

reducing only the size of said images in constructing said pyramid.

51. The computer readable medium in accordance with claim 50, wherein said step of reducing only the size of said images in constructing said pyramid comprises:

using a low-pass filter designed for reducing in half the sampling frequency with minimal loss of information.

52. A method for performing image motion compensation between images in a temporal sequence by computing a deformation function from an initial deformation function, said method comprising:

(a) acquiring a reference image and an initial floating image;

(b) setting said initial deformation function as a current deformation function;

(c) warping said initial floating image with said current deformation function so as to obtain a current warped floating image;

(d) computing using a computer to compute a current similarity measure between said reference image and said current warped floating image;

(e) using a computer to compute the current gradient of said current similarity measure with respect to said current deformation function;

(f) regularizing said current gradient so as to ensure its invertibility to obtain a current regularized gradient;

(g) (A) in the first performance of this step, setting said current regularized gradient as current conjugate gradient, and (B) in subsequent iterations of this step, conjugating said current regularized gradient with said current conjugate gradient so as to obtain a subsequent conjugate gradient;

(h) composing said subsequent conjugate gradient with said current deformation function so as to obtain a subsequent deformation function;

(i) setting said current deformation function as said subsequent deformation function; (j) setting said current conjugate gradient as said subsequent conjugate gradient;

(k) going to step (c) and repeating until a predetermined stop criterion is reached; and (l) defining the current warped floating image as a final warped floating image.

53. A method in accordance with claim 52, wherein said predetermined stop criterion comprises reaching at least one of:

predetermined maximum number of repetitions or iterations of the recited sequence of steps;

a predetermined lower limit for said gradient; zero for said gradient; and a predetermined processing time limit.

54. A method in accordance with claim 52 comprising beginning iterations at a low resolution level and proceeding through increasingly higher resolutions.

55. A method in accordance with claim 52, wherein said step of acquiring a reference image and an initial floating image comprises:

utilizing a medical imaging technique, including any of magnetic resonance imaging (MRI), X-ray imaging, and CT scan imaging.

56. A method in accordance with claim 55, wherein said step of acquiring a reference image and an initial floating comprises:

utilizing a medical imaging technique for detection of at least one of tumors and potential tumors in breast cancer.

57. A method in accordance with claim 55, wherein said step of acquiring a reference image and an initial floating image comprises:

utilizing a medical imaging technique for obtaining images indicating suspect tissue exhibiting a more rapid intake (wash-in) of contrast agent, as well as a more rapid washout than adjacent, non-tumor tissue.

58. A method in accordance with claim 55, comprising a step of utilizing said motion-corrected image to detect suspect tissue through comparison of images of a patient made before and after such wash-in and/or washout.

59. A method in accordance with claim 52, wherein said step of acquiring reference and initial floating images comprises:

retrieving at least one of said images from any of: a storage medium, a computer, a radio link, the Internet, an infrared link, an acoustic link, a scanning device, and a live imaging device.

60. A system for performing image motion compensation, comprising:

a memory device for storing a program and other data; and a processor in communication with said memory device, said processor operative with said program to perform:

(a) setting an initial deformation function as a current deformation function;

(b) warping said initial floating image with said current deformation function so as to obtain a current warped floating image;

(c) computing a current similarity measure between said reference image and said current warped floating image;

(d) computing the current gradient of said current similarity measure with respect to said current deformation function;

(e) regularizing said current gradient so as to ensure its invertibility to obtain a current regularized gradient;

(f) (A) in the first performance of this step, setting said current regularized gradient as current conjugate gradient, and (B) in subsequent iterations of this step, conjugating said current regularized gradient with said current conjugate gradient so as to obtain a subsequent conjugate gradient;

(g) composing said subsequent conjugate gradient with said current deformation function so as to obtain a subsequent deformation function;

(h) setting said current deformation function as said subsequent deformation function;

(i) setting said current conjugate gradient as said subsequent conjugate gradient;

(j) going to step (b) and repeating until reaching a predetermined stop criterion; and (k) defining the current warped floating image as a final warped floating image.

61. A system in accordance with claim 60, including performing said iterations beginning at a low resolution level and proceeding through increasingly higher resolutions.

62. A system in accordance with claim 60, wherein reaching said stop criterion comprises at least one of reaching:
- a predetermined maximum number of repetitions or iterations of the recited sequence of steps;
- a predetermined lower limit for said gradient;
- zero for said gradient; and
- a predetermined processing time limit.

63. A computer readable medium having a computer program logic recorded thereon for program code for performing image motion compensation by:
   (a) setting an initial deformation function as a current deformation function;
   (b) warping an initial floating image with said current deformation function so as to obtain a current warped floating image;
   (c) computing a current similarity measure between a reference image and said current warped floating image;
   (d) computing the current gradient of said current similarity measure with respect to said current deformation function;
   (e) regularizing said current gradient so as to ensure its invertibility to obtain a current regularized gradient;
   (f) (A) in the first performance of this step, setting said current regularized gradient as current conjugate gradient, and
   (B) in subsequent iterations of this step, conjugating said current regularized gradient with said current conjugate gradient so as to obtain a subsequent conjugate gradient;
   (g) composing said subsequent conjugate gradient with said current deformation function so as to obtain a subsequent deformation function;
   (h) setting said current deformation function as said subsequent deformation function;
   (i) setting said current conjugate gradient as said subsequent conjugate gradient;
   (j) going to step (b) and repeating until reaching a predetermined stop criterion; and
   (k) define the current warped floating image as a final warped floating image.

64. The computer readable medium in accordance with claim 63, including
performing said iterations beginning at a low resolution level and proceeding through increasingly higher resolutions.

65. The computer readable medium in accordance with claim 63, wherein said stop criterion comprises at least one of reaching:
- a predetermined maximum number of repetitions or iterations of the recited sequence of steps;
- a predetermined lower limit for said gradient;
- zero for said gradient; and
- a predetermined processing time limit.

* * * * *